United States Patent [19]

Ishiguro et al.

[11] Patent Number: 4,563,397

[45] Date of Patent: Jan. 7, 1986

[54] PROCESS FOR PRODUCING A MAGNETIC RECORDING MATERIAL AND ARTICLE PRODUCED

[75] Inventors: Ikuo Ishiguro, Samukawa; Hiroyuki Nagao, Hiratsuka, both of Japan

[73] Assignee: Pilot Man-Nen-Hitsu Kabushiki Kaisha, Tokyo, Japan

[21] Appl. No.: 649,299

[22] Filed: Sep. 11, 1984

[30] Foreign Application Priority Data

Sep. 19, 1983 [JP]  Japan .................................. 58-173682

[51] Int. Cl.$^4$ ........................... C25D 9/06; C25D 9/08; G11B 5/62
[52] U.S. Cl. .................................. 428/469; 204/32.1; 204/33; 204/37.6; 204/42; 360/131
[58] Field of Search ................. 204/42, 33, 37.6, 32.1; 360/131; 428/469, 472

[56] References Cited

U.S. PATENT DOCUMENTS 4,109,287  8/1978  Kawai et al. ........................ 360/131

FOREIGN PATENT DOCUMENTS

| 154599 | 12/1980 | Japan | 204/42 |
| 23207 | 5/1981 | Japan | 204/42 |
| 16098 | 1/1983 | Japan | 204/42 |
| 55593 | 4/1983 | Japan | 204/42 |

*Primary Examiner*—G. L. Kaplan
*Attorney, Agent, or Firm*—Wenderoth, Lind & Ponack

[57] ABSTRACT

Aluminum or an aluminum alloy on the surface of which an anodic oxide film comprising a porous layer and a barrier layer having micropores in the porous layer has been formed by a primary anodic oxidation treatment is subjected to a secondary anodic oxidation treatment and an immersion treatment so as to enlarge the pore diameter of the micropores, to make the cross-sectional profile of the micropores circular, and to make the thickness of the barrier layer and thus, the length of the micropores uniform, and subjecting the so treated aluminum or aluminum alloy to an electrolytic deposition treatment in an electrolytic bath containing a magnetic substance so as to uniformly allow a large amount of the magnetic substance to be deposited in the enlarged, uniform micropores, thereby obtaining a magnetic recording material having improved magnetic intensity and magnetic characteristics.

4 Claims, No Drawings

PROCESS FOR PRODUCING A MAGNETIC RECORDING MATERIAL AND ARTICLE PRODUCED

BACKGROUND OF THE INVENTION

This invention relates to a process for producing a magnetic recording material comprising aluminum or an aluminum alloy on the surface of which a magnetic recording layer having an increased magnetic intensity is formed, and which is suitable for use in a computer, a magnetic disc for a video, a magnetic sheet, etc., and to the magnetic recording material obtained by such process.

Several proposals have been heretofore made concerning magnetic recording materials made of aluminum or aluminum alloys. For example, U.S. Pat. No. 4,109,287 discloses a magnetic recording material comprising aluminum or aluminum alloy on the surface of which a film having a great number of micropores is formed by an anodic oxidation treatment, each of the micropores being substantially completely filled with a magnetic substance by an electrolytic treatment in an electrolyte containing dissolved therein a salt of the magnetic substance.

As is well known, an anodic oxide film on the surface of aluminum or aluminum alloys which is formed by an anodic oxidation treatment consists of a porous layer and a barrier layer. The porous layer occupying the major portion of the film has a great number of elongated micropores which extend in the direction perpendicular to the surface of the base metal and are arranged closely and relatively uniformly at a minute distance from each other. The thin barrier layer lies between the bottom of the micropore and the base metal. The film generally has excellent hardness, wear resistance, adhesiveness, and other desirable characterisitcs.

Therefore, when the micropores are filled with a magnetic substance, it is densely and relatively uniformly introduced. The resultant magnetic recording material is capable of high density recording and also has other excellent magnetic characteristics.

Furthermore, Japanese Pat. No. 1079289 (Japanese Examined Patent Publication No. 56-23207) proposes further anodic oxidation of aluminum or aluminum alloy on the surface of which an anodic oxide film is formed by an anodic oxidation treatment in an acidic bath in order to enlarge the pore diameter of the micropores in the film, thereby causing a magnetic substance to be deposited in the resultant micropores in a larger amount.

In accordance with this proposal, it is possible to obtain a magnetic recording material having an increased amount of the magnetic substance deposited in the micropores and exhibiting an increased magnetic intensity. However, the barrier layer lying between the micropores and the base metal is not uniform in thickness, and, thus, the lengths of the micropores are not uniform. In addition, the cross section of each micropore has a jagged profile, for example, a star-shaped profile. Therefore, this magnetic recording material leaves something to be desired with respect to the pore diameter of the micropores. When magnetic recording is carried out by using this magnetic recording material, the squareness ratio, i.e., intensity of residual magnetization/intensity of saturated magnetization, of the magnetic hysteresis is poor.

SUMMARY OF THE INVENTION

Therefore, an object of the present invention is to provide a process for producing a magnetic recording material having an increased squareness ratio and a further improved magnetic intensity which are realized by making the thickness of the barrier layer, i.e., the lengths of the micropores, uniform and making the pore diameter of the micropores larger and to provide a magnetic recording material obtained by this process.

We have discovered that when aluminum or aluminum alloy on the surface of which an anodic oxide film has been formed by a primary anodic oxidation treatment is further subjected to a combination of a secondary anodic oxidation treatment and an immersion treatment in an acidic bath, the thickness of the barrier layer becomes uniform and the diameter of the micropores is remarkably enlarged. This invention has been developed on the basis of this new knowledge.

Thus, the present invention provides a process for producing a magnetic recording material which comprises subjecting aluminum or aluminum alloy on the surface of which an anodic oxide film has been formed by a primary anodic oxidation treatment to a secondary anodic oxidation treatment and an immersion treatment in an acidic bath, and, then, subjecting the resultant aluminum or aluminum alloy to an electrolytic deposition treatment in an electrolytic bath, and also provides a magnetic recording material obtained by this process.

DETAILED DESCRIPTION OF THE INVENTION

The present invention will be further explained below. First, aluminum or aluminum alloy is subjected to an anodic oxidation treatment to form an anodic oxide film having micropores on the surface thereof. This anodic oxidation treatment is referred to as a primary anodic oxidation treatment in the present invention.

The starting material used in the present invention is preferably high purity aluminum. The use of such high purity aluminum provides an anodic oxide film having a uniform thickness. Aluminum alloys with other metals, for example, copper, magnesium or zinc can be successfully used. It is preferable that the starting material be in the form of a sheet or a foil.

The primary anodic oxidation treatment is usually carried out by using an acidic bath containing about 1 to about 500 g/l of an inorganic acid such as sulfuric acid and chromic acid, or an organic acid such as oxalic acid, sulfosalicylic acid or sulfamic acid under the conditions of a bath temperature of 5° to 50° C., a current density of about 1 to about 10 A/dm$^2$, a direct, direct-alternating superimposed or alternating-current voltage, a period of about 1 to about 90 minutes, and a stirring such as air-blowing or liquid circulation.

The aluminum or aluminum alloy on the surface of which an anodic oxide film having a thickness of 0.1 to 50 μm has been formed in the above described manner, is then subjected to an anodic oxidation treatment and an immersion treatment in an acidic bath. The anodic oxidation treatment and the immersion treatment may be carried out in any order. That is, the anodic oxidation treatment and the immersion treatment may be conducted in that order or in the reverse order. The anodic oxidation treatment at this stage is referred to as a secondary anodic oxidation treatment in the present invention.

The secondary anodic oxidation treatment is ordinarily carried out by using an acidic bath of about 1 to about 500 g/l of an acid or acids selected from inorganic acids such as phosphoric acid and sulfuric acid, and organic acids such as oxalic acid, sulfosalicylic acid and sulfamic acid, and mixtures thereof, the inorganic acid and the organic acid being respectively used in a single form or mixed form, under the conditions of a bath temperature of about −5° to about 50° C., a direct-current voltage of about 10 to about 40 V and a period of about 1 to about 30 minutes.

The immersion treatment is usually carried out by immersing the aluminum or aluminum alloy in an acidic bath of the acid or acids thus selected of substantially the same concentration range (about 1 to about 500 g/l), and temperature range (about −5° to about 50° C.) as those in the secondary anodic oxidation treatment for about 1 to about 30 minutes.

The aluminum or aluminum alloy thus subjected to the secondary anodic oxidation treatment and the immersion treatment in the acidic bath is then subjected to an electrolytic deposition treatment in an electrolytic bath containing a magnetic substance so as to cause the magnetic substance to be deposited in the micropores formed in the anodic oxide film. The electrolytic deposition treatment is carried out by using an electrolyte containing one or more salts of magnetic metals such as iron, cobalt and nickel. This electrolyte may optionally contain at least one member selected from the group consisting of manganese salts, chromium salts, magnesium slats, rare earth metal salts, and the like, or at least one additive selected from the group consisting of glycerine, polyhydric alcohols, urea, ammonium sulfate, thiourea, boric acid, cresolsulfonic acid, sulfosalicylic acid and the like. The electrolytic deposition treatment is ordinarily carried out under the condition of a bath temperature of about 0° to about 60° C., an alternating-current voltage of about 9 to about 20 V, a period of 5 to 90 minutes, and a pH of not greater than about 7.

The micropores in the anodic oxide film formed by the primary anodic oxidation treatment has a pore diameter of about 100 to about 200 Å and has a starshaped jagged cross sectional profile. After the secondary anodic oxidation treatment and immersion treatment in the acidic bath, the pore diameter of the micropores is enlarged to about 250 to 300 Å, and the cross sectional profiles of the micropores become substantially circular. In addition, the barrier layer is controlled to a uniform thickness of about 100 to about 200 Å, and the length of the micropores is made uniform, accordingly. Therefore, a larger amount of a magnetic substance can be uniformly packed into the so formed micropores by the electrolytic deposition treatment.

As is apparent from the foregoing, the application of a combination of the secondary anodic oxidation treatment and the immersion treatment in the acidic bath is effective for enlarging the diameter of the micropores, for making the cross-sectional profile of the micropores circular, and for making the barrier layer thickness uniform. According to our observations, it is considered that the immersion treatment largely contributes to enlarging the diameter of the micropores and making the cross-sectional profile of the micropores circular, and the secondary anodic oxidation treatment largely contributes to making the barrier layer thickness uniform. Of course, the present invention is not bound to this theory in any way.

Thus, the pore diameter enlarging and circularizing effects result in an increase in the amount of the magnetic substance to be deposited in the micropores, and, thus, in an improvement in the magnetic intensity. At the same time, the barrier layer thickness uniformizing effect results in uniformity in the length of the micropores, with the result that the individual micropores having packed thereinto the magnetic substance exhibit uniform magnetic properties, and an excellent squareness ratio. In accordance with the present invention, it is possible to obtain a magnetic recording material whose magnetic recording layer exhibits an improved magnetic intensity and excellent magnetic properties.

In the present invention, the secondary anodic oxidation treatment, the immersion treatment, and the electrolytic deposition treatment may be applied to aluminum or aluminum alloy on the surface of which an anodic oxide film has been previously formed in another place by the primary anodic oxidation treatment. Alternatively, the entire process beginning with the primary anodic oxidation treatment and ending in the electrolytic deposition treatment may be successively carried out.

The present invention will now be illustrated in more detail by way of Examples.

EXAMPLE 1

In this example, the secondary anodic oxidation treatment and the immersion treatment were carried out in that order.

An aluminum sheet (purity 99.99%, thickness 4.0 mm) was subjected to a primary anodic oxidation treatment in a sulfuric acid bath having a concentration of 180 g/l at a temperature of 20° C. and at a carrent density of 1.5 A/dm$^2$ for 25 minutes, to form an anodic oxide film having a thickness of about 10$\mu$ and micropores having a pore diameter of about 150 Å on the surface of the aluminum sheet. Then, the so treated aluminum sheet was placed in a phosphoric acid bath having a concentration of 50 g/l and a temperature of 20° C., and a direct-current voltage of 20 V was applied to the aluminum sheet for 5 minutes so as to conduct a secondary anodic oxidation treatment. Then, the so treated aluminum sheet was subjected to an immersion treatment in a sulfuric acid bath having a concentration of 200 g/l at a temperature of 40° C. for 6 minutes.

The thus obtained aluminum sheet was subjected to an electrolytic deposition treatment in an electrolytic bath containing 95 g/l of cobalt sulfate, 5 g/l of ferrous sulfate, 20 g/l of boric acid, and 15 ml/l of glycerine at a temperature of 30° C. and at an alternating-current voltage of 15 V for 30 minutes.

In the magnetic recording material thus obtained, the micropores had a pore diameter of about 250 to about 300 Å, a cross-sectional profile in the form of a circle, and a uniform barrier layer thickness of about 200 Å.

EXAMPLE 2

In this example, a starting material was treated in the order of the immersion treatment and the secondary anodic oxidation treatment.

An aluminum sheet (purity 99.99%) was subjected to the same primary anodic oxidation treatment as that described in Example 1. The so treated aluminum sheet was immersed in a sulfuric acid bath having a concentration of 250 g/l at a temperature of 50° C. for 4 minutes. Then, the resultant aluminum sheet was placed in a phosphoric acid bath having a concentration of 100 g/l at a temperature of 20° C., and a direct-current voltage of 17 V was applied to the aluminum sheet for 3 minutes so as to conduct a secondary anodic oxidation treatment.

Then, the so treated aluminum sheet was subjected to an electrolytic deposition treatment in an electrolytic bath containing 100 g/l of cobalt sulfate, 200 g/l of boric acid, and 20 ml/l of glycerine at a temperature of 30° C. and at an alternating-current voltage of 15 V for 30 minutes.

In the magnetic recording material thus obtained, the micropores had a pore diameter of about 250 to about 300 Å, a cross-sectional profile in the form of a circle, and a uniform barrier layer thickness of about 170 Å.

CONTROL EXAMPLE 1

A magnetic recording material was produced according to the same procedure as that described in Example 2, except that the immersion treatment and the secondary anodic oxidation treatment were not carried out.

CONTROL EXAMPLE 2

A magetic recording material was produced according to the same procedure as that described in Example 2, except that the immersion treatment was not conducted.

The magnetic characteristics of the magnetic recording materials obtained in Examples 1 and 2 and Control Examples 1 and 2 are shown in the following table.

TABLE

|  | Coersive force (Oe) | Magnetic flux density (emu/cc) | Recording density $D_{50}$ (BPI) |
|---|---|---|---|
| Example 1 | 1000 | 200 | 40,000 |
| Example 2 | 1000 | 150 | 30,000 |
| Control Example 1 | 1000 | 75 | 12,000 |
| Control Example 2 | 1000 | 130 | 25,000 |

As is apparent from the above table, the magnetic recording materials obtained in Examples 1 and 2 wherein both the immersion treatment and the secondary anodic oxidation treatment were carried out, exhibited a remarkably high recording density, as compared with the magnetic recording materials obtained in Control Examples 1 and 2 wherein one or both of the immersion treatment and the secondary anodic oxidation treatment were not conducted. Furthermore, in the conventional coating type $\gamma$-$Fe_2O_3$ disc, the recording density is about 10,000 BPI, which value is remarkably lower than in Examples 1 and 2.

Therefore, the magnetic recording material obtained according to the present invention exhibits a remarkably high recording density as compared with the conventional magnetic recording materials, and thus, has an excellent characteristic which permits the material to be used as a high density recording material for a computer, a magnetic disc for a video, a magnetic sheet and the like.

It is to be understood that the present invention is not limited to the above-mentioned examples in any way, but various alterations are possible within the scope of the present invention.

What is claimed is:

1. A process for producing a magnetic recording material comprising:

subjecting aluminum or aluminum alloy the surface of which bears an anodic oxide film formed by a primary anodic oxidation treatment in an acidic bath containing sulfuric acid or oxalic acid to a secondary anodic oxidation treatment in an acidic bath containing phosphoric acid and an immersion treatment in an acidic bath selected from the group consisting of phosphoric acid, sulfuric acid, oxalic acid, sulfosalicylic acid, sulfamic acid and mixtures thereof; and subjecting the so-treated aluminum or aluminum alloy to an electrolytic deposition treatment in an electrolyte containing a magnetic substance.

2. A process according to claim 1, wherein the secondary anodic oxidation treatment and the immersion treatment in the acidic bath are carried out in that order.

3. A process according to claim 1, wherein the secondary anodic oxidation treatment and the immersion treatment in the acidic bath are carried out in the reverse order.

4. A magnetic recording material obtained according to a process of claim 1.

* * * * *